United States Patent
Itzkovich

(10) Patent No.: US 11,748,343 B2
(45) Date of Patent: Sep. 5, 2023

(54) METHOD AND SYSTEM FOR AGGREGATING REGULATIONS FOR AUTOMOTIVE DATA

(71) Applicant: OTONOMO TECHNOLOGIES LTD., Even Yehuda (IL)

(72) Inventor: Yosef Haim Itzkovich, Raanana (IL)

(73) Assignee: OTONOMO TECHNOLOGIES LTD., Herzeliya (IL)

(*) Notice: Subject to any disclaimer, the term of this patent is extended or adjusted under 35 U.S.C. 154(b) by 0 days.

(21) Appl. No.: 16/683,981

(22) Filed: Nov. 14, 2019

(65) Prior Publication Data

US 2021/0073217 A1    Mar. 11, 2021

Related U.S. Application Data

(63) Continuation-in-part of application No. PCT/IL2018/050526, filed on May 14, 2018.

(60) Provisional application No. 62/505,923, filed on May 14, 2017.

(51) Int. Cl.
- *G06F 16/242* (2019.01)
- *G06F 16/28* (2019.01)
- *G06F 16/23* (2019.01)
- *G06F 16/2457* (2019.01)

(52) U.S. Cl.
CPC ........ *G06F 16/244* (2019.01); *G06F 16/2358* (2019.01); *G06F 16/2457* (2019.01); *G06F 16/288* (2019.01)

(58) Field of Classification Search
None
See application file for complete search history.

(56) References Cited

U.S. PATENT DOCUMENTS

| | | | |
|---|---|---|---|
| 8,463,488 B1* | 6/2013 | Hart | G06F 17/00 701/32.4 |
| 9,959,334 B1* | 5/2018 | Bar-Zeev | B64C 39/024 |
| 2005/0192916 A1 | 9/2005 | Serrano-Morales et al. | |
| 2007/0282713 A1* | 12/2007 | Ullman | G06Q 10/087 705/26.1 |
| 2008/0147584 A1 | 6/2008 | Buss | |
| 2009/0157586 A1 | 6/2009 | Zhang et al. | |
| 2011/0276215 A1* | 11/2011 | Wendling | G08G 1/096775 701/31.4 |
| 2012/0109451 A1* | 5/2012 | Tan | G08G 1/096775 701/36 |

(Continued)

OTHER PUBLICATIONS

Distributed Regulation Allocation with Aggregator Coordinated Electric Vehicles, Sun et al. (Year: 2013).*

(Continued)

*Primary Examiner* — Augustine K. Obisesan
(74) *Attorney, Agent, or Firm* — PEARL COHEN ZEDEK LATZER BARATZ LLP

(57) ABSTRACT

A method and system for generating aggregation from a plurality of sets of regulations are disclosed herein. The method may include the following steps: collecting a plurality of set of regulations, wherein a number of regulations in each set of regulations is significantly higher than a set of objects to which the regulations apply; generating a regulations and restriction in a form of a network of the collected sets of regulations; and applying a user defined inference algorithm to derive an applied aggregation responsive to a user-defined use case.

8 Claims, 2 Drawing Sheets

(56) References Cited

U.S. PATENT DOCUMENTS

| | | |
|---|---|---|
| 2013/0085977 A1 | 4/2013 | Junker |
| 2015/0188752 A1 | 7/2015 | Kudo et al. |
| 2016/0138934 A1* | 5/2016 | Kim .................. G01C 21/32 |
| | | 701/451 |
| 2018/0204470 A1* | 7/2018 | Rezvani .............. G08G 5/0034 |

OTHER PUBLICATIONS

International Search Report for PCT Application No. PCT/IL2018/050526, dated Sep. 13, 2018.

* cited by examiner

METHOD AND SYSTEM FOR AGGREGATING REGULATIONS FOR AUTOMOTIVE DATA

CROSS-REFERENCE TO RELATED APPLICATIONS

This application is a continuation-in-part of PCT Application No. PCT/IL2018/050526, filed on May 14, 2018, which claims the benefit of U.S. Provisional Patent Application No. 62/505,923, filed on May 14, 2017, each of which is hereby incorporated by reference in its entirety.

FIELD OF THE INVENTION

The present invention relates generally to automatic computerized data aggregating, and more particularly, to computerized regulations aggregating for automotive data.

BACKGROUND OF THE INVENTION

Prior to the background of the invention being set forth, it may be helpful to provide definitions of certain terms that will be used hereinafter.

The term "connected vehicle" as used herein is defined as a car or any other motor vehicle such as a drone or an aerial vehicle that is equipped with any form of wireless network connectivity enabling it to provide and collect data from the wireless network. The data originated from and related to connected vehicles and their parts is referred herein collectively as "automotive data".

The term "data marketplace" or "data market" as used herein is defined as an online platform preferably implemented on a cloud that enables a plurality of users (e.g. subscribers or consumers) to access and consume data originated by various data sources (e.g. data providers). Data marketplaces typically offer various types of data for different markets and from different sources. Common types of data consumers include business intelligence, financial institutions, demographics, research and market data. Data types can be mixed and structured in a variety of ways. Data providers may offer data in specific formats for individual clients.

Data consumed in these marketplaces is used by businesses of all kinds, fleets, business and safety applications and many types of analysts. Data marketplaces have proliferated with the growth of big data, as the amount of data collected by municipalities and smart cities, businesses, websites and services has increased, and all that data has become increasingly recognized as an asset.

The term "data anonymization" as used herein is defined as type of information sanitization whose intent is privacy protection. It is the process of either encrypting or removing personally identifiable information from data sets, so that the people whom the data describe remain anonymous.

The term General Data Protection Regulation (GDPR) as used herein is a regulation in the European Union (EU) law on protection and privacy for all individuals within the EU. The GDPR aims primarily to give control to individuals over their personal data and to simplify the regulatory environment for international business by unifying the regulation within the EU. Similar privacy legislations such as the California Consumer Privacy Act (CCPA) were enacted in other jurisdictions around the world.

When large volumes of business regulations (such as those related to the management of data related to connected vehicles) need to be assessed against facts or data, the constant screening for applicability can be costly, both in terms of evaluation (and re-evaluation) and in terms of ordering the statements properly.

One non-limiting example is the emerging domain of connected vehicles whose day to day operation involves many privacy-related issues such as the GDPR. Legally speaking there is a challenge to address these issues as privacy laws are territorial and tend to change from one jurisdiction to another. Connected vehicles driving through various jurisdictions may therefore be affected by changing privacy laws. In addition, many other regulations are applied at the same time.

Other domains also involve situations in which a very large number of regulations are grouped in many sets and are applied to a relatively small number of objects. The challenge is to try and aggregate the regulations that are applied to all objects but takes into account all set of regulations.

SUMMARY OF THE INVENTION

A method and a system for aggregating automotive data regulations from a plurality of data sources are provided herein. The system may include a computer processor; a regulations collection module executed on said computer processor and configured to collect a plurality of sets of automotive data regulations from a plurality of sources by unifying subsets of the sets of automotive data regulations; and an aggregation module executed on said computer processor and configured to: select an aggregation type from a plurality of predetermined regulations aggregation types, wherein the selecting is based on respective use cases applicable to specified data consumers; and apply the aggregation type to the subsets of the sets of automotive data regulations, responsive to the selecting, to yield aggregated automotive data regulations that are tailored per the respective use cases applicable to the specified data consumers.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
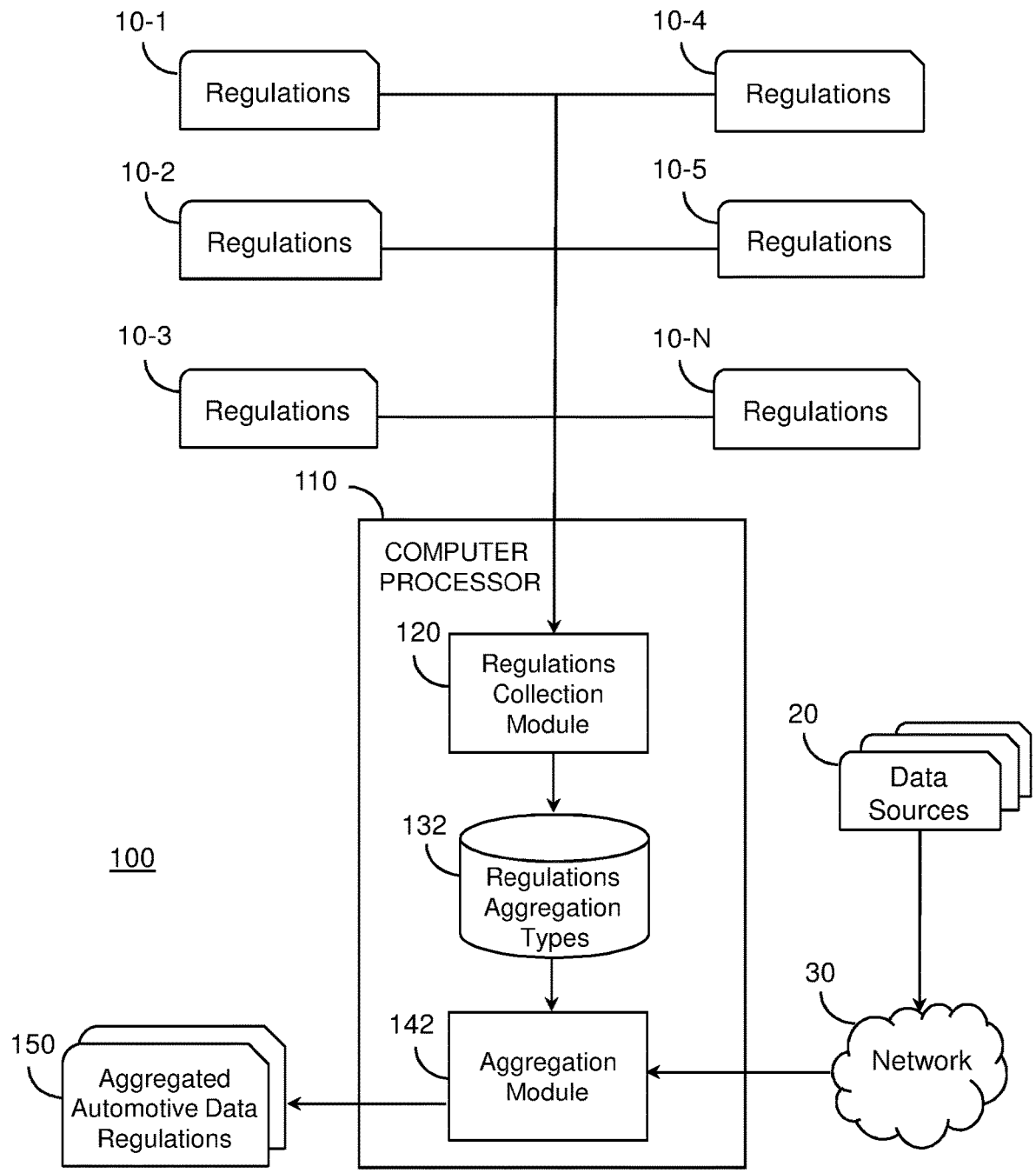
FIG. 1 is a block diagram illustrating non-limiting exemplary architecture of one system in accordance with some embodiments of the present invention.

It will be appreciated that, for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following description, various aspects of the present invention will be described. For purposes of explanation, specific configurations and details are set forth in order to provide a thorough understanding of the present invention.

However, it will also be apparent to one skilled in the art that the present invention may be practiced without the specific details presented herein. Furthermore, well known features may be omitted or simplified in order not to obscure the present invention.

Unless specifically stated otherwise, as apparent from the following discussions, it is appreciated that throughout the specification discussions utilizing terms such as "processing," "computing" "calculating" "determining" or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

There are several types of regulation enforcing that are being dealt with in accordance with some embodiments of the present invention, depending on the restrictions and how dynamic are the constraints/regulations that need to be applied on the data.

FIG. 1 is a block diagram illustrating non-limiting exemplary architecture of the system in accordance with some embodiments of the present invention. System 100 is a system for generating aggregation from a plurality of sets of regulations. System 100 may include a computer processor 110 connected via a network 30 to a plurality of data sources 20. System 100 may further include a regulations collection module 120 executed on computer processor 110 and may be configured to collect a plurality of sets of automotive data regulations 10-1 to 10-N from a plurality of sources by unifying subsets of the sets of automotive data regulations.

System 100 may further include an aggregation module 142 executed on computer processor 110 and may be configured to: select an aggregation type from a plurality of predetermined regulations aggregation types 132, wherein the selecting is based on respective use cases applicable to specified data consumers. Aggregation module 142 may be further configured to apply the aggregation type to the subsets of the sets of automotive data regulations, responsive to the selecting, to yield aggregated automotive data regulations that are tailored per the respective use cases applicable to the specified data consumers.

Regulations Collection Module

According to some embodiments of the present invention, each set of different regulations or International Organization for Standardization (ISO) rules is implemented as a separate collection of regulations. For example, privacy regulations of European Union (EU), Germany regulations, custom regulations, a specified vendor's best practice and the like.

According to some embodiments of the present invention, each collection may be a network which may be optimized for numerous regulations with few objects. The optimization may also be related to the type of the query, for example: location, identification (ID) type and the like.

Unifying Regulations

According to some embodiments of the present invention, the pluralities of regulations set are created and are associated with an ID that is unique for a certain set of regulations. For example, all the regulations that are applicable to automotive data in France and also relevant to custom regulations may be associated with a unique ID. Unifying the regulations and creating a single regulations tree out of a plurality of regulations tree serves as an enabler in later aggregating the regulations per types of regulations aggregating.

Aggregations Types

According to some embodiments of the present invention, three types of regulations aggregations are contemplated in order to address the most common use cases for data consumes:

1. Unity mode—Comprehensive automotive data regulations aggregation. For this mode, there is a single set of regulations that is applicable to all automotive data. This covers a data source (data provider) that, because of its origin and/or content, would be permissible to use one generic policy. For example, in a set of public data from a specific region in the United States. for example, a trivial case would be where automotive data is gathered only from the United States, and so there is no need to consolidate the data with other data sources.
2. Aggregative Mode—A different aggregation mechanism is applied to different data according to data ID or data type. for example, data is received on the same stream from the Unites States and Great Britain. There is a need of the data marketplace (cloud platform) to understand for each jurisdiction which set of regulations is applicable.
3. Aggregative Resolution Mode—This is similar to the aggregative mode but may change over time and further factors in and addresses potential conflicts between two or more regulation sets applied to the same data. For example, automotive data may be obtained in Europe but from several countries, so there are EU regulations but additionally there are local regulations from, for example, Great Britain, France, and Germany, such that a conflict resolution mechanism is implemented onto the aggregated data. Yet another example is where different restrictions apply on data transfer for different sensors on the same car, wherein certain regulations that may apply to data associated with the fuel are different from regulations that may apply to data associated with the brakes of the car.

According to some embodiments of the present invention, the conflict resolution may be implemented using a cost function that assigns either a cost or a penalty to respective unresolved conflicts. Thus, the conflict resolution mechanism may prioritize certain solutions over others. Additionally, a threshold-based approach can be used, namely, specifying the threshold from which the system is allowed to resolve automatically.

An example for a cost function is an amount of non-usable automotive data, calculations of unused sensors and/or non-usable use cases.

An example for a data source that contains car data with different content would be data that was originated from an On-Board Diagnostic (OBD) dongle vs. data that was originated from a proprietary "Black Box".

The Aggregative Resolution Mode is the most difficult scenario when the aggregation that should apply to a specific entity can change during time, allowing customized regulations to be added by Data Suppliers/Car Owners/Market manager and the like.

Unity Mode

Some embodiments of the present invention allow the creation of the aggregation by combining all the collection (regulations) that need to be applied:

State/Authority regulations;
Supplier regulation;
Driver/owner regulations; and

Marketplace Manager/Facilitator regulations.

According to some embodiments of the present invention, once the tree is created, it is passed to the aggregation enforcer which uses inference algorithm to execute and apply aggregation and regulation on each data element.

Aggregative Mode

Some embodiments of the present invention create aggregation Table, by Assign Aggregation per each category.

Handling Aggregative Mode may be in the form of an extension of the Unity mode. Instead of creating on "generic" regulation, it has been understood by the inventor that some entities are bound by different set of regulations that they need to follow. For example, cars in France operate under different regulations than cars in the United states.

The way of enforcing regulation in this mode may be as follows: classify each entity to a different categorized entity, and apply any of the offer three approaches:

Use a default "generic" (much like in Unity) to all non-categorized entities.

Throw all data that has no category

Use inference algorithm with the proper aggregation (regulations and restriction) according to the Aggregation Table and apply regulations on each data element.

Aggregative Resolution Mode

According to some embodiments of the present invention, an "Aggregative Resolution Mode" is yet another extension of the previous mentioned "Aggregative Mode".

The addition here is that the Aggregation Table is Dynamic and can be changed over time.

Some embodiments of the present invention offer several mechanisms according the frequency and detection requirements:

Periodic—once an hour/day (less than that is probably not feasible for large amount of entities) then the Aggregation Table will be re-calculated and updated.

Periodic+External Hints—The regulation aggregation module will use hints received from external sources indicating change and will update the table in runtime.

Possible Sources:
1. A real-time processing system that is responsible of determining aggregation changes;
2. Clients/source indications to recalculate policy; and
3. Internal Processing—The regulation aggregation module will process the data and will detect the changes by its own.

Aggregation Load/Update:
1. For each object, a so-called "lazy load" of the IDs aggregation is carried out, so it is fetched and saved on demand.
2. Aggregation cleanup—a periodically cleanup is being run and remove stale entries (hadn't been requested for more than M minutes).

Figure 2:
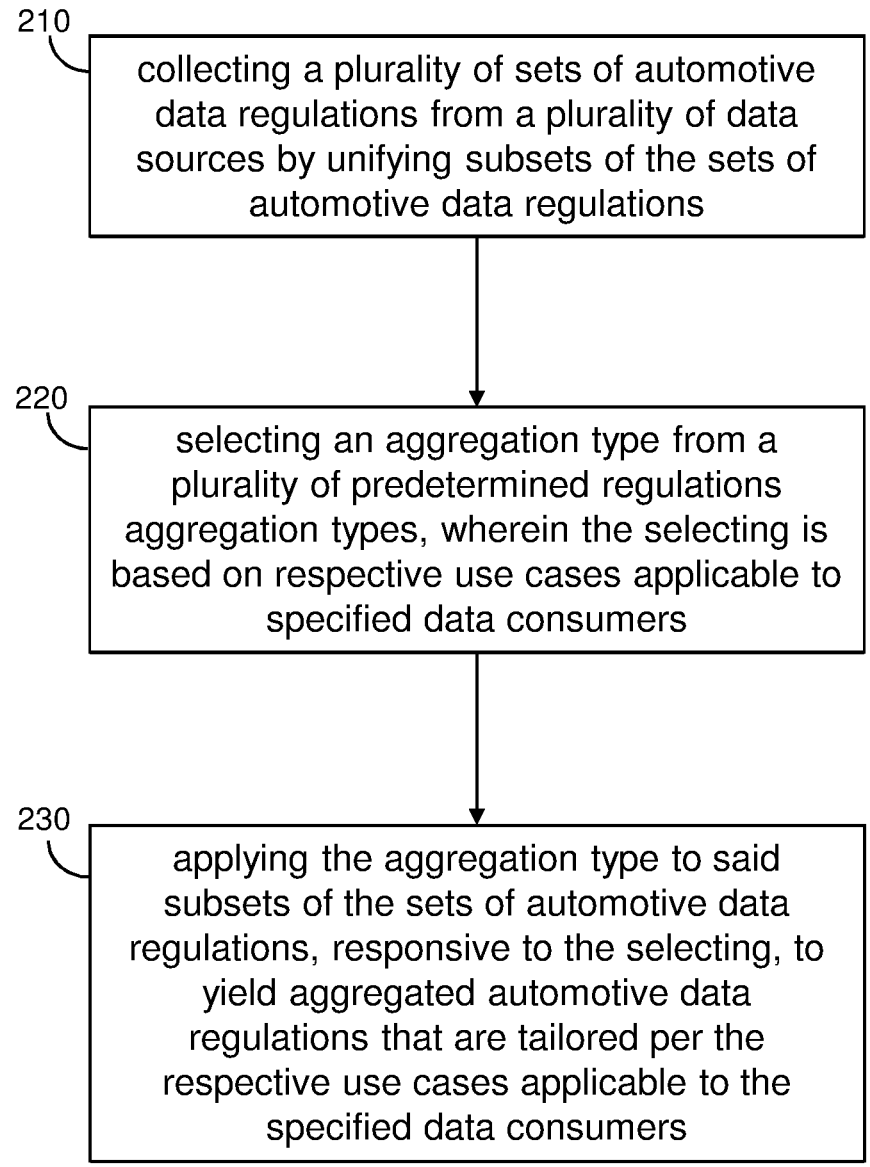
FIG. 2 is a high-level flowchart illustrating non-limiting exemplary method in accordance with embodiments of the present invention.

FIG. 2 is a high-level flowchart illustrating non-limiting exemplary method in accordance with some embodiments of the present invention. A method 200 of aggregating automotive data regulations from a plurality of data sources is illustrated herein. Method 200 may include the following steps: collecting a plurality of sets of automotive data regulations from a plurality of data sources by unifying subsets of the sets of automotive data regulations 210; selecting an aggregation type from a plurality of predetermined regulations aggregation types, wherein the selecting is based on respective use cases applicable to specified data consumers 220; and applying the aggregation type to said subsets of the sets of automotive data regulations, responsive to the selecting, to yield aggregated automotive data regulations that are tailored per said respective use cases applicable to said specified data consumers 230.

According to some embodiments of the present invention, a method of generating aggregation from a plurality of sets of regulations, is provided and may include: collecting a plurality of sets of regulations; and generating a regulations and restriction in a form of a network of regulations rendered executable by an aggregation module associated with said collected sets of regulations, wherein the collecting and the generating are executed by a computer processor.

According to some embodiments of the present invention, the method discussed herein may further include the step of applying a user defined inference algorithm, to said aggregation module, to derive an applied aggregation responsive to a respective user-defined use case.

According to some embodiments of the present invention, for the method discussed herein, a number of regulations in each set of regulations is significantly higher than a set of objects to which said regulations apply.

According to some embodiments of the present invention, for the method discussed herein, a number of regulations in each set of regulations is at least one hundred times higher than a set of objects to which said regulations apply.

According to some embodiments of the present invention, for the method discussed herein, the aggregation module may be configured to operate in a unity mode in which one set of regulations is applied to all types of data.

According to some embodiments of the present invention, for the method discussed herein, the aggregation module may be configured to operate in an aggregative mode in which different sets of regulations are applied to different types and/or identity of data.

According to some embodiments of the present invention, for the method discussed herein, the aggregation module may be configured to operate in a aggregative resolution mode in which different sets of regulations are applied to different types and/or identity of data, wherein the sets of regulations further change over time.

According to some embodiments of the present invention, for the method discussed herein, the regulations may include regulations applicable to data related to connected cars (e.g. "automotive data regulations").

According to some embodiments of the present invention, for the method discussed herein, the aggregation module may be further configured to use hints received from external sources indicating change of at least some of the regulations and further carry out an update in runtime.

In order to implement the method according to embodiments of the present invention, a computer processor may receive instructions and data from a read-only memory or a random-access memory or both. At least one of aforementioned steps may be performed by at least one processor associated with a computer. The essential elements of a computer are a processor for executing instructions and one or more memories for storing instructions and data. Generally, a computer will also include, or be operatively coupled to communicate with, one or more mass storage devices for storing data files. Storage modules suitable for tangibly embodying computer program instructions and data include all forms of non-volatile memory, including by way of example semiconductor memory devices, such as EPROM, EEPROM, and flash memory devices and magneto-optic storage devices.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in base band or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++, Python or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or portion diagrams of methods, apparatus (systems) and computer program products according to embodiments of the invention. It will be understood that each portion of the flowchart illustrations and/or portion diagrams, and combinations of portions in the flowchart illustrations and/or portion diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or portion diagram portion or portions.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or portion diagram portion or portions.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or portion diagram portion or portions.

The aforementioned flowchart and diagrams illustrate the architecture, functionality, and operation of possible implementations of systems, methods and computer program products according to various embodiments of the present invention. In this regard, each portion in the flowchart or portion diagrams may represent a module, segment, or portion of code, which comprises one or more executable instructions for implementing the specified logical function(s). It should also be noted that, in some alternative implementations, the functions noted in the portion may occur out of the order noted in the figures. For example, two portions shown in succession may, in fact, be executed substantially concurrently, or the portions may sometimes be executed in the reverse order, depending upon the functionality involved. It will also be noted that each portion of the portion diagrams and/or flowchart illustration, and combinations of portions in the portion diagrams and/or flowchart illustration, can be implemented by special purpose hardware-based systems that perform the specified functions or acts, or combinations of special purpose hardware and computer instructions.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional elements.

It is to be understood that where the claims or specification refer to "a" or "an" element, such reference is not be construed that there is only one of that elements.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A method of aggregating automotive data regulations from a plurality of data sources, the method comprising:
   collecting a plurality of sets of automotive data regulations from a plurality of data sources by unifying subsets of the sets of automotive data regulations;
   selecting an aggregation type from a plurality of predetermined regulations aggregation types, wherein the selecting is based on respective use cases applicable to specified data consumers; and
   applying the aggregation type to said subsets of the sets of automotive data regulations, responsive to the selecting, to yield aggregated automotive data regulations that are tailored per said respective use cases applicable to said specified data consumers,
   wherein said automotive data regulations comprise at least one data protection rule and at least one non data protection rule, applicable to automotive data collected by at least one of a plurality of sensors of one of a plurality of connected cars, located at one of a plurality of jurisdictions,
   and wherein said applying of the aggregation type is further based on a change to said automotive data regulations over time, and
   wherein some of the regulations apply different restrictions on data transfer for different ones of the plurality of the sensors on a same one of the connected cars,
   wherein one of said aggregation types is a unity mode in which one set of automotive data regulations is applied to all types of automotive data,
   wherein one of said aggregation types is an aggregative mode in which different sets of automotive data regulations are applied to different types and/or identities of automotive data,
   wherein one of said aggregation types is an aggregative resolution mode in which different sets of automotive data regulations are applied to different types and/or identities of data,
   wherein said sets of automotive data regulations further change over time,
   wherein said aggregative resolution mode further comprise a conflict resolution mechanism that resolves conflicts between different automotive data regulations applicable to same automotive data, and
   wherein said selecting comprises applying a user defined inference algorithm, to deduce said type of aggregation responsive to a user-defined use case.

2. The method according to claim 1, wherein a number of automotive data regulations in said sets of regulations is significantly higher than a set of connected vehicles to which said automotive data regulations apply.

3. The method according to claim 1, further comprising allocating a cost or a penalty to detected conflicts between different automotive data regulations in order to reduce the cost or penalty of the detected conflicts.

4. The method according to claim 1, further comprising using hints received from external sources indicating change of at least some of the regulations and carrying out an update in runtime to said subsets of the sets of automotive data regulations.

5. A system for aggregating automotive data regulations from a plurality of data sources, the system comprising:
a computer processor;
a regulations collection module executed on said computer processor and configured to collect a plurality of sets of automotive data regulations from a plurality of sources by unifying subsets of the sets of automotive data regulations; and
an aggregation module executed on said computer processor and configured to:
select an aggregation type from a plurality of predetermined regulations aggregation types, wherein the selecting is based on respective use cases applicable to specified data consumers; and
apply the aggregation type to said subsets of the sets of automotive data regulations, responsive to the selecting, to yield aggregated automotive data regulations that are tailored per said respective use cases applicable to said specified data consumers
wherein said automotive data regulations comprise at least one data protection rule and at least one non data protection rule, applicable to automotive data collected by at least one of a plurality of sensors of one of a plurality of connected cars, located at one of a plurality of jurisdictions,
and wherein said applying of the aggregation type is further based on a change to said automotive data regulations over time, and
wherein some of the regulations apply different restrictions on data transfer for different ones of the plurality of the sensors on a same one of the connected cars,
wherein one of said aggregation types is a unity mode in which one set of automotive data regulations is applied to all types of automotive data,
wherein one of said aggregation types is an aggregative mode in which different sets of automotive data regulations are applied to different types and/or identities of automotive data,
wherein one of said aggregation types is an aggregative resolution mode in which different sets of automotive data regulations are applied to different types and/or identities of data,
wherein said sets of automotive data regulations further change over time,
wherein said aggregative resolution mode further comprise a conflict resolution mechanism that resolves conflicts between different automotive data regulations applicable to same automotive data, and
wherein said selecting by the aggregation module comprises applying a user defined inference algorithm, to deduce said type of aggregation responsive to a user-defined use case.

6. The system according to claim 5, wherein a number of automotive data regulations in said sets of regulations is significantly higher than a set of connected vehicles to which said automotive data regulations apply.

7. The system according to claim 5, wherein said aggregative resolution mode further comprise a conflict resolution mechanism that resolves conflicts between different automotive data regulations applicable to same automotive data.

8. A non-transitory computer readable medium comprising a set of instructions that when executed cause at least one computer processor to:
collect a plurality of sets of automotive data regulations from a plurality of sources by unifying subsets of the sets of automotive data regulations; and
an aggregation module executed on said computer processor and configured to:
select an aggregation type from a plurality of predetermined regulations aggregation types, wherein the selecting is based on respective use cases applicable to specified data consumers; and
apply the aggregation type to said subsets of the sets of automotive data regulations, responsive to the selecting, to yield aggregated automotive data regulations that are tailored per said respective use cases applicable to said specified data consumers,
wherein said automotive data regulations comprise at least one data protection rule and at least one non data protection rule, applicable to automotive data collected by at least one of a plurality of sensors of one of a plurality of connected cars, located at one of a plurality of jurisdictions,
and wherein said applying of the aggregation type is further based on a change to said automotive data regulations over time, and
wherein some of the regulations apply different restrictions on data transfer for different ones of the plurality of the sensors on a same one of the connected cars,
wherein one of said aggregation types is a unity mode in which one set of automotive data regulations is applied to all types of automotive data,
wherein one of said aggregation types is an aggregative mode in which different sets of automotive data regulations are applied to different types and/or identities of automotive data, and
wherein one of said aggregation types is an aggregative resolution mode in which different sets of automotive data regulations are applied to different types and/or identities of data, wherein said sets of automotive data regulations further change over time,
wherein said aggregative resolution mode further comprise a conflict resolution mechanism that resolves conflicts between different automotive data regulations applicable to same automotive data, and
wherein said selecting by the aggregation module comprises applying a user defined inference algorithm, to deduce said type of aggregation responsive to a user-defined use case.

* * * * *